J. A. RAMSEY & C. P. HULBURD.
MOVING PICTURE CAMERA.
APPLICATION FILED DEC. 9, 1912.
1,159,796.
Patented Nov. 9, 1915.
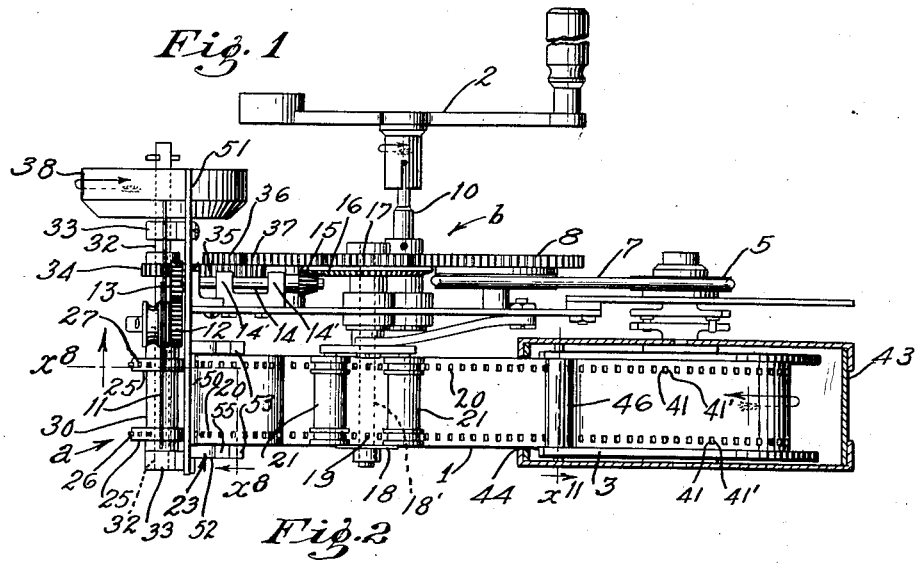
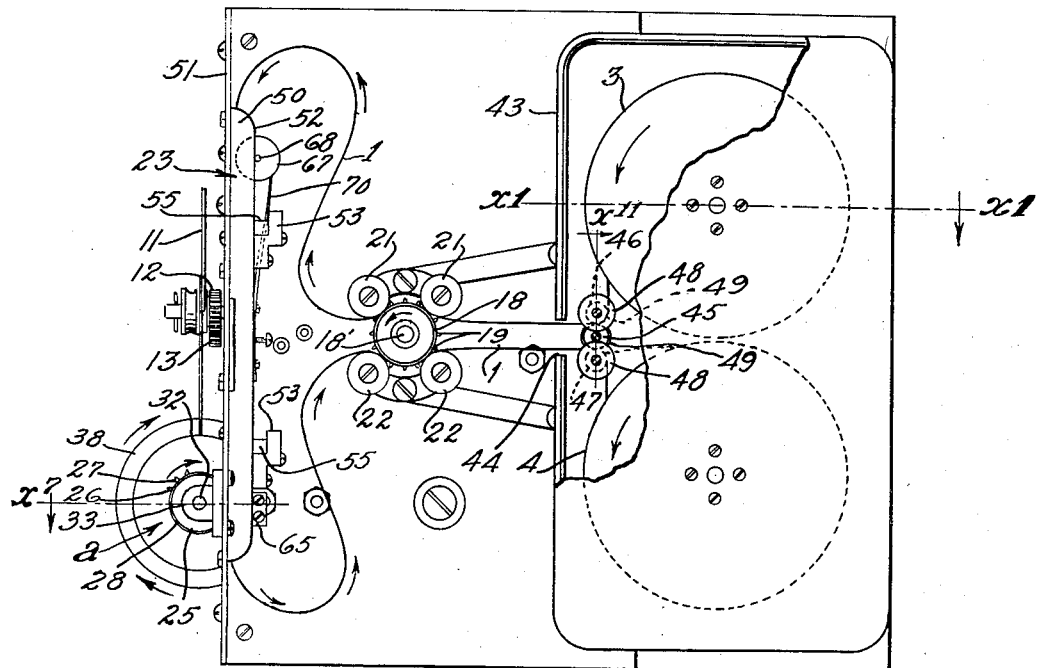

UNITED STATES PATENT OFFICE.

JOHN A. RAMSEY AND CHARLES P. HULBURD, OF LOS ANGELES, CALIFORNIA, ASSIGNORS TO CHARLES F. EYTON CO., OF LOS ANGELES, CALIFORNIA.

MOVING-PICTURE CAMERA.

1,159,796.  Specification of Letters Patent.  Patented Nov. 9, 1915.

Application filed December 9, 1912. Serial No. 735,835.

*To all whom it may concern:*

Be it known that we, JOHN ALEXANDER RAMSEY and CHARLES P. HULBURD, both citizens of the United States, residing at Los Angeles, in the county of Los Angeles and State of California, have invented a new and useful Moving-Picture Camera, of which the following is a specification.

An object of this invention is the provision of a device of this character which will make a series of exposures without the vibration usually attendant on the operation of the camera.

Other objects are to provide for perfect spacing; to provide means to intermittently drive the film in such manner that said driving means are out of contact with the film while the film is in its stopped exposure making position; and to minimize the size of the camera.

In devices of the kind heretofore in use some parts of the film driving mechanism have been given an intermittent rotary vibrating or reciprocating motion, such motion tending to cause jarring of the camera and consequent blurring of the images on the film, and an object of this invention is to avoid such blurring and to obtain sharp definition and this we do by causing continuous or constant motion of all of the parts of the driving mechanism.

Generally stated, means are provided to intermittently engage the film, said means being geared in proper time relation to the shutter.

More specifically, wheels with teeth on only a portion of their peripheries or mutilated sprocket wheels are employed to effect the desired intermittent motion of the film. The teeth of the film actuating sprockets may be of the form heretofore employed in connection with moving picture cameras but to secure the best results the first teeth that catch the film, hereinafter designated as the starting teeth, are mutilated or are cut in such manner as to engage the edge of the film slot in a plane substantially normal to the plane of the film so as to minimize the radial thrust of the tooth and to maximize the tangential thrust of the tooth on the film thus giving the film a steady, constant and uniform motion from the moment the starting tooth engages the film to the moment when the film actuating sprocket ceases to engage the film. The film engaging face of the starting tooth may be more or less undercut.

Other objects and advantages may appear from the subjoined detail description.

The accompanying drawings illustrate the invention.

Figure 1 is a broken plan view of the invention, the cover being omitted and the film magazine being in section on line indicated by $x^1$, Fig. 2. Fig. 2 is an elevation of Fig. 1 from the side opposite to the operating side, a portion of the film magazine being broken away for clearness of illustration. Fig. 3 is a fragmentary sectional elevation on line indicated by $x^3$, Fig. 1. The parts are shown in positions they occupy at a starting point of the actuation of the film. Fig. 4 is an elevational detail of the toothed portion of one of the film actuating wheels. Arrows on the section lines of the various views indicate the direction of sight.

Intermittent non-vibrating, non-reciprocating constant motion tape engaging means $a$ are provided to cause the desired motion of the film and said means are operated by constant motion mechanism $b$ which may be driven by any suitable means and in this instance is driven by hand through the weighted crank 2 in the usual manner of operating motion picture cameras.

The tape 1 is normally fed from a feed reel or spool 3 and is wound upon a spool 4, both of said spools being driven through the usual clutch sheaves 5, 6 respectively, tension belt 7, combined sheave and spur gear wheel 8 by a main driving spur wheel 9 of the constant motion mechanism $b$, said driving spur gear wheel being fixed to the crank shaft 10 which is turned by the operating crank 2.

The tape 1 as is usual in this class of apparatus may be driven in either direction by appropriate operation of the crank 2 and when driven forward in the direction of the arrows adjacent thereto in Fig. 2, the clutch sheave 5 will be out of commission so that the spool 3 will be free to turn independent of said sheave, and the clutch sheave 6 will be in commission to positively drive the spool 4; and when driven backward in the reverse direction, the clutch sheave 5 will be in commission and the clutch sheave 6 will be out of commission so that the tape will always be positively drawn regardless of the direction of operation. As this method of alternately driving the spools 3, 4, is well known in the art, the operation of the spools and sheaves will be understood without more detailed description.

A rotary shutter 11 of the character generally employed in motion picture cameras or of any other suitable type may also be used in this device and is driven through meshing spur gear wheels 12, 13, shaft 14, journaled at 14', meshing bevel gear wheels 15, 16, spur gear wheel 17 and the spur gear wheel 8 by the driving spur gear wheel 9 all of which gear wheels and shaft are comprised by the constant motion mechanism $b$.

The tape 1 is led from the spools 3, 4 over and under the constant feed roller 18 which is mounted on a shaft 18' driven through the spur gear wheel 17 by the spur gear wheel 8 and which may be provided with the usual teeth 19 adapted to engage the usual marginal teeth-receiving perforations 20 of the film that is held in contact with said constant feed roller by upper and lower idler rollers 21, 22 respectively; and the film is thence led to the upper and lower ends of a vertical guide or gate 23 which may be of the usual or the preferred construction as hereinafter described and which holds the tape in contact with the margins of the exposure opening 24 that is opened and closed at appropriate intervals by the rotary shutter 11.

It is clear that the gear wheel 17 may be turned in either direction to feed the tape 1 forward in the direction of the arrows adjacent thereto in Fig. 2 by turning the crank 2 clockwise or to feed the tape reversely by turning the crank counter-clockwise.

The intermittent film engaging and actuating means $a$ are preferably of a rotary character and employ a pair of toothed wheels or mutilated sprocket wheels 25, of which only the starting and intermediate teeth 26, 27 come into actual contact with the tape 1, the plain or inter-tooth portion 28 of the rim being spaced apart from the tape so as to produce the clearance 29. The wheels 25 are each provided with two circumferential portions extending over unequal lengths of arcs, the portion having the longer arc being untoothed and the portion having the shorter arc being provided with but three fixed teeth, two undercut teeth 26 and the intermediate tooth 27, to engage the tape perforations 20. The mutilated sprocket wheels 25 are in axial relation to one another and may be formed integral with and connected by a hub 30 which is fixed by screws or the like to a constant motion shaft 32 that is suitably journaled as at 33 and that is driven through spur gear wheels 34, 35, 36, and 37 by the driving spur gear wheel 9 and said shaft is provided with a fly wheel 38.

Ordinarily the tape 1 will be driven in the direction of the arrows adjacent thereof by turning the crank 2 clockwise in Fig. 3 but it is understood that the tape may be reversely driven as is sometimes desirable in producing freak pictures, double exposures and the like.

The starting teeth 26 are mutilated and may have their film engaging faces straight and constructed as at 39 in Figs. 6 and 4 parallel to radial planes $c$ passing through the tips of the teeth and through the axis of the shaft 32 or may have their film engaging faces undercut and formed at an angle to radial planes passing through said axis and touching the outer extremity of said faces, said angle being five degrees more or less, and in other words at an angle from said radial planes, so that the film engaging faces 39 will contact with the perforation edges 41 at an angle substantially normal to the plane of the tape at said contact, thus minimizing the radial thrust and maximizing the tangential thrust of the starting teeth against the tape. The undercut teeth 26 are arranged in front of and behind the intermediate teeth 27 and their straight film engaging faces 39 are turned in reverse directions so that some of said teeth will always act to start the film forward or backward.

In the drawings the pitch of the gear teeth 26, 27 is the same as the pitch of the teeth would be on a sprocket wheel of like diameter supplied with sixteen teeth around its entire circumference but in this instance thirteen of the teeth are omitted so as to leave but three teeth. The feed roller 18 is provided with sixteen teeth 19 of the same pitch as the teeth 27 and the gear ratio of the constant motion mechanism $b$ is such that when the crank 2 is turned the feed roller will be given one turn to four turns of the sprocket wheels 25 in order that the feed of the tape will correspond to the movement of the tape produced by the intermittent action of the sprocket wheels.

It is understood that the diameters of the gear wheels 25 and feed roller 18 and the number of teeth may be varied within the judgment and desire of the constructor, providing only that the gear ratio of the constant motion mechanism $b$ be such as to produce one revolution of the shutter 11 to every revolution of the sprocket wheels 25 and that the feed of the tape correspond therewith as described.

The starting teeth 26 are provided between their tips and their film engaging faces 39 with curved faces 42 so that when the starting teeth are near and practically at the end of their film actuating stroke said teeth will clear the slot edges 41 or 41′ by ample margin.

From the foregoing it is clear that when the film engaging wheels 25 are caused to turn in the direction of the arrow or in a reverse direction the front or back starting teeth 26, as the case may be, will engage the perforation edges 41 or 41′ at each revolution or cycle of said wheels at practically a right angle to the plane of the tape and will instantly start the tape into motion; and that said motion will be uniform and even from the start until the back or front starting teeth 26, as the case may be, have ceased their impelling action on the film at each revolution of the film engaging wheels; and it is clear that, when the starting teeth 26 are rotated in the direction of the arrows adjacent thereto from their initial film starting position shown in solid lines in Fig. 3 to the finish of their effective cyclic stroke, the film engaging faces 39 will catch and hold the film so that the film will not lag or slip backward relative to the direction of motion as is the case when the film engaging faces are rounded in the usual manner somewhat in the form of the intermediate teeth 27. It is desired to emphasize the importance of this construction for the angle of the film engaging faces of the starting teeth 26 bears such relation to the sliding of said faces across the perforation edges 41 or 41′, as the case may be, when the sprocket wheels 25 are turned as to prevent slippage of the tape relative to the actuating sprocket wheels 25 and cause an absolutely uniform and steady progression of the tape from start to finish of the motion, thereby producing perfect spacing of the exposures along the film.

From the foregoing it is seen that the film actuating means $a$ do not contact with or engage the tape during exposure of the tape but only contact with said tape during the actuating action, thus preventing the transmission of vibration from the constant motion mechanism $b$ to the tape when the tape is stationary so as to avoid the making of blurred images on the film.

The spools 3, 4 are preferably inclosed in a film magazine 43 which is provided with a rectangular opening 44 to admit of the passage of the tape 1 from the spools to the feed roller 18. Rotary means are provided adjacent the rectangular opening 44 to guide the tape 1 free from the edges of said opening and for this purpose there are provided inside of the film magazine 43 an intermediate plain roller 45 between the upper and lower limbs of the tape and upper and lower pressure rollers 46, 47 above and below said limbs respectively. The intermediate roller 45 is of exactly or substantially the same width as the tape 1 and the upper and lower rollers 46, 47 are provided at their ends with flanges 48 which overlap or extend over the ends of the intermediate roller so as to prevent lateral movement or escape of the tape from between the rollers. The rollers 45, 46, 47 are preferably provided with a covering 49 of suitable material as velvet, felt, or the like, to prevent injury to the sensitized face of the tape.

The gate 23 comprises a front guide plate 50 which is fixed to a standard plate 51 and which is provided at both sides with flanges 52 and upper and lower clamp brackets 53, and the gate 23 comprises a detachable back guide plate 54 that slides between the flanges 52 and that is provided with upper and lower clamping bars 55, the ends of which engage the clamp brackets 53 to hold the back guide plate in place. The front guide plate 50 and the standard plate 51 are slotted at 56, 57 respectively to admit the rims of the sprocket wheels 25. The back guide plate 54 is provided at its lower end in line with the shoulders 58 with channel forming bosses 65 which are slightly spaced apart from the inner face of the front guide plate for the accommodation of the tape 1. From the foregoing it is clear that the tape will extend straight along the faces of the bosses 65 and that the channels 66 in the bosses 65 accommodate the sprocket teeth 26, 27 so that when the sprocket wheels 25 are turned, the teeth engaged perforated edges of the tape will be held in a perfect tangential plane relative to the sprocket wheels and the tape cannot be bent or thrust backward away from said sprockets. It is seen that the tape adjacent the actuating mechanism $a$ is non-resiliently held against movement away from said mechanism. By this special construction and arrangement of the gate 23 and the arrangement and shape of the sprocket teeth 26, 27 hereinbefore described, the film 1 will be positively moved in a perfect plane and though non-resiliently held against movement radially of the sprocket wheels 25 will not be injured by the impelling action of the sprocket wheels.

The tension spring, not shown, need only be sufficient to hold the tape flat against the front guide plate 50, and in fact, the tension is so slight that, owing to the bosses 65 positively holding the tape against bending, the film may be driven reversely as well as forwardly by turning the crank 2 in the appropriate direction.

The upper end of the gate 23 is provided with idler rollers 67 on a shaft 68 which is journaled at 69 to a leaf spring 70 that holds the idler rollers toward the guide plate 50.

It is apparent that the teeth 26 may be cut from tip to root along the radial plane $c$ or at a distance on either side of said radial plane to form the film engaging faces 39 so as in a measure to effect the desired results, it being understood that we do not limit ourselves to the exact position and angles of said film engaging faces shown in the drawings.

The set of only three teeth moves the tape in a straight perpendicular path without any tendency to bend the tape. The showing of three teeth in the drawings is not intended as a limitation since it is clear that the film actuating sprocket wheels 25 could employ a different number of teeth without limiting the scope of the invention. This is readily understood for if the film extended in a curve part way around the circumference of the sprocket wheels in a manner well known in the art a greater number of sprocket teeth could be used.

Though we have shown the invention embodied in a motion picture camera, it is understood that some of the advantages accruing from the employment of certain features of the device would also be beneficial in a motion picture projecting machine, in which perfect spacing of the pictures and the minimization of vibration are desirable.

In practical operation the camera will be set up in the customary manner on a tripod or the like, not shown, and the crank 2 will be turned in either direction by the operator at the requisite speed to effect say sixteen revolutions per second of the shutter 11 and film actuating sprocket wheels 25, which are all so adjusted relative to one another as to cause actuation of the tape 1 by the teeth 26, 27 while the exposure opening 24 is closed by the shutter and to cause cessation of said actuation while the exposure opening is uncovered by the shutter, thus intermittently moving the tape and producing sixteen exposures per second, said exposures being perfectly spaced along the tape and being of clear definition.

During rotation of the sprocket wheels the tape will ride upon the curved face of the intermediate teeth from the tips toward the roots of the teeth, thus relieving the tape from contact with the starting teeth and the starting teeth thus freed from contact with the tape will still be in the plane of the tape while the intermediate teeth are in contact with the tape so that when the starting teeth leave the plane of the tape their film engaging faces will clear the edges of the perforations and avoid tearing them.

It is obvious that it does not matter whether or not the tape progresses at a uniform rate of speed from picture to picture, for during the progress of the tape the shutter is closed, but it is highly important, and this is one of the great advantages of our construction, that when the starting teeth leave the plane of the tape, the film engaging faces of said teeth will clear the edges of the perforations so as to avoid all liability of tearing and bending the tape and this is due to the tooth 27 coming into commission to feed the tape faster than it is being fed by the tooth 26 which consequently moves backward relative to the tape to quickly disengage the tape.

From the foregoing it is clear that the working faces of the teeth 26 may be of any suitable shape, all that is essential being that the space between the working face of one starting tooth and the corresponding face of an adjacent tooth be appropriate to accommodate the material of the tape between the perforations, it being obvious that said working face may be perfectly straight or somewhat curved or curved at one portion and straight at another without avoiding the principles and broad features of the invention, it being understood that we have shown the shape of teeth which we at present deem most advisable to use to obtain the best results.

That which is absolutely necessary as a fundamental feature of the invention is that the tooth 27 be so spaced from the starting tooth 26 as to relieve the starting tooth 26 from engagement with the tape before the starting tooth 26 passes out of the plane of the tape. Primarily it is not the shape of the working face that enables the starting tooth 26 to clear the tape but rather it is the spacing of said teeth relative to the spacing of the tape perforations and we do not wish to limit the interpretation of the invention to the exact contour of the teeth shown in the drawings.

We claim:—

1. A moving picture camera comprising a wheel having a tooth, said tooth being provided with a straight substantially radial film engaging face, and means to turn the wheel.

2. A moving picture camera comprising a wheel having a tooth operable to engage the film the film engaging surface of the tooth being under-cut, and means to turn the wheel.

3. The combination in a moving picture camera employing a perforated tape, of a wheel having a tooth, said tooth having a straight face adapted to contact with edges of the perforations at an angle substantially normal to the plane of the tape and the face being in alinement with a radius of the wheel at said contact, and said tooth having a curved face between said straight face and the tip of the tooth, and means to turn the wheel.

4. In a moving picture camera, the combination of a sprocket wheel provided with a tooth having a straight face adapted to engage the picture tape and extending outward from its root at an angle away from a radial plane passing through the axis of the wheel and through said tooth, and means to turn the wheel.

5. A moving picture camera comprising a wheel having a film engaging tooth, non-resilient means to hold the film in a tangential plane relative to said wheel, said tooth being provided with a face adapted to engage the film substantially at right angles to said tangential plane and the face being in alinement with a radius of the wheel at said engagement, and means to turn said wheel.

6. In a moving picture camera, a wheel having a non-vibrating tooth provided with a substantially straight radial face to intermittently engage the film and means to turn said wheel.

7. In a machine adapted to operate on a tape having perforations spaced at equal intervals therealong, the combination of a wheel having a starting tooth and a second tooth provided with faces designed to enter said perforations, the space between the working face of the starting tooth and the working face of the second tooth decreasing from greater to less than the spacing between the front or working faces of said perforations, the working face of the starting tooth being straight and substantially radial and adapted to engage the tape, and means to operate the wheel.

8. In a machine adapted to operate on a tape having perforations spaced therealong, the combination of a continuously operated wheel having two circumferential portions extending over unequal lengths of arcs, the portion having the longer arc being untoothed and the portion having the shorter arc being provided with a fixed tooth provided with a substantially straight radial face designed to engage the edges of said perforations, and means to operate the wheel.

9. In a machine adapted to operate on a tape having perforations spaced therealong, the combination of a continuously operated wheel having two circumferential portions extending over unequal lengths of arcs, the portion having the longer arc being untoothed and the portion having the shorter arc being provided with but three teeth, one of said teeth having a straight substantially radial face to engage the edges of said perforations, and means to operate the wheel.

10. A device of the character described, comprising a mutilated sprocket wheel having a fixed mutilated tooth provided with a substantially radial tape engaging face, and means to turn said wheel.

11. A moving picture camera comprising a wheel having means fixed at its periphery provided with a substantially radial face to engage a film intermittently at each revolution of said wheel, means to hold the film against bending, and means to turn said wheel.

In testimony whereof, we have hereunto set our hands at Los Angeles California this 3d day of December, 1912.

JOHN A. RAMSEY.
CHARLES P. HULBURD.

In presence of—
JAMES R. TOWNSEND,
GEORGE H. HILES.